United States Patent

[11] 3,600,991

| [72] | Inventors | Shigeo Kojima;<br>Tsutomu Nishi; Tetsunoke Ogo; Tetsuo Sasaki, all of Kawasaki-shi, Japan |
|---|---|---|
| [21] | Appl. No. | 767,234 |
| [22] | Filed | Oct. 14, 1968 |
| [45] | Patented | Aug. 24, 1971 |
| [73] | Assignee | Nippon Kokan Kabushiki Kaisha |
| [32] | Priority | Oct. 14, 1967 |
| [33] | | Japan |
| [31] | | 42/65,892 |

[54] FLYING PIPE CUTTING APPARATUS
7 Claims, 13 Drawing Figs.

| [52] | U.S. Cl. | 82/53.1 |
|---|---|---|
| [51] | Int. Cl. | B23b 5/14 |
| [50] | Field of Search | 82/53.1, 52, 63, 64, 68, 46 |

[56] References Cited
UNITED STATES PATENTS

| 1,100,747 | 6/1914 | Krauss | 82/68 |
| 2,112,396 | 3/1938 | Corrigan | 82/63 |
| 2,675,076 | 4/1954 | Billeter | 82/53.1 X |
| 3,108,819 | 10/1963 | McKay | 82/46 X |
| 3,369,432 | 2/1968 | Davis | 82/53.1 |

FOREIGN PATENTS

| 234,401 | 1/1945 | Switzerland | 82/64 |

*Primary Examiner*—Leonidas Vlachos
*Attorney*—Robert D. Flynn

ABSTRACT: In a flying pipe cutting apparatus a carriage carrying a cutting machine is started by means detecting the speed of a continuously running pipe being cut and a plurality of clamping mechanisms are operated to clamp the pipe when the cutting machine attains the same speed as the running pipe. Thereafter the cutting machine is moved by the running pipe and a cutter is urged against the pipe at an incremented speed provided by a differential gear mechanism located between clamping mechanisms.

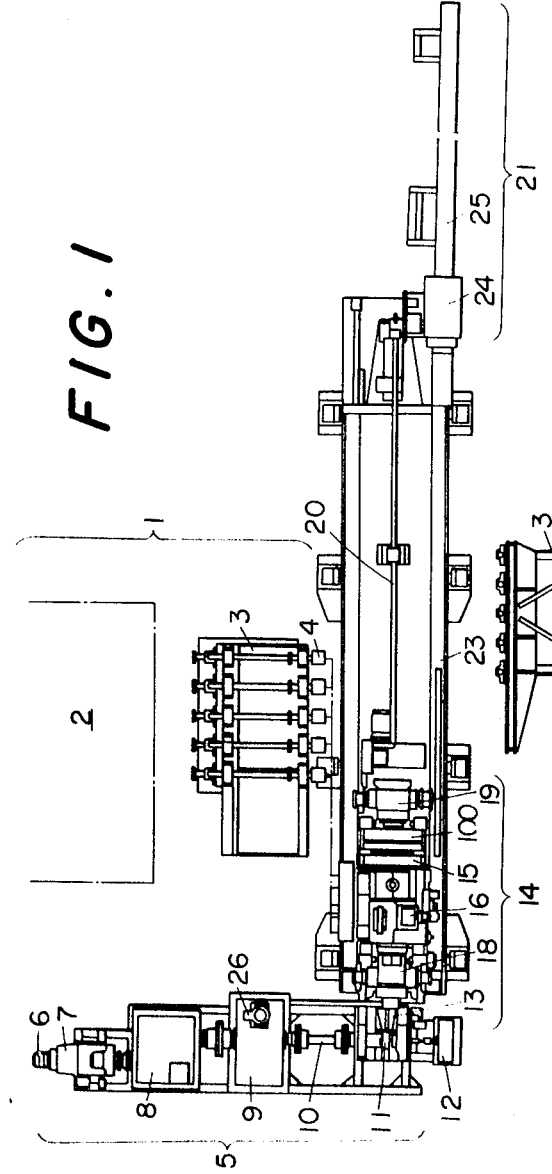
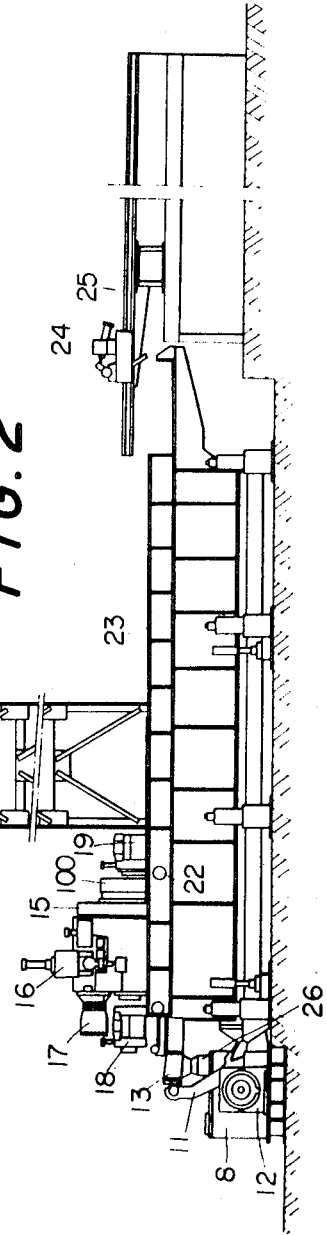

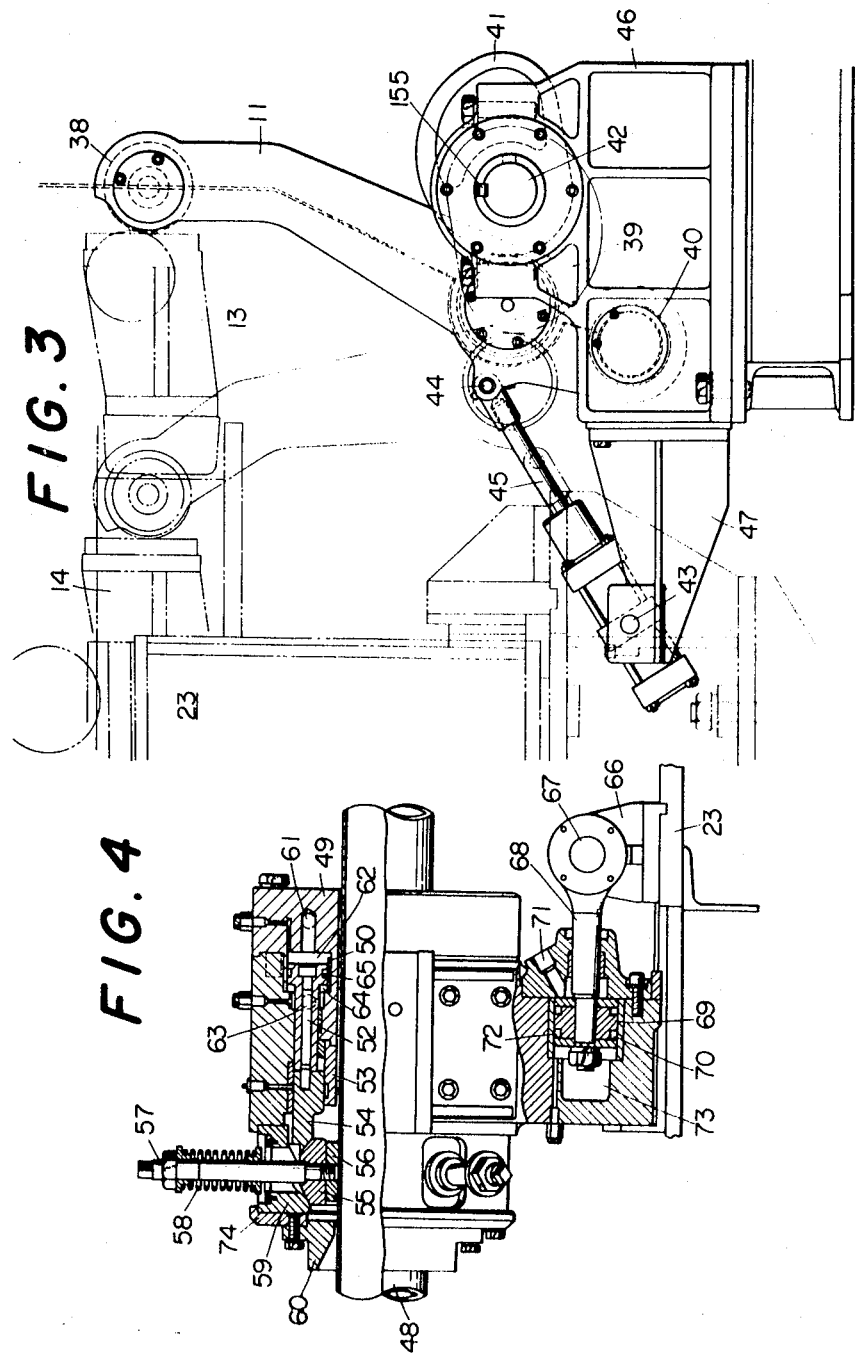

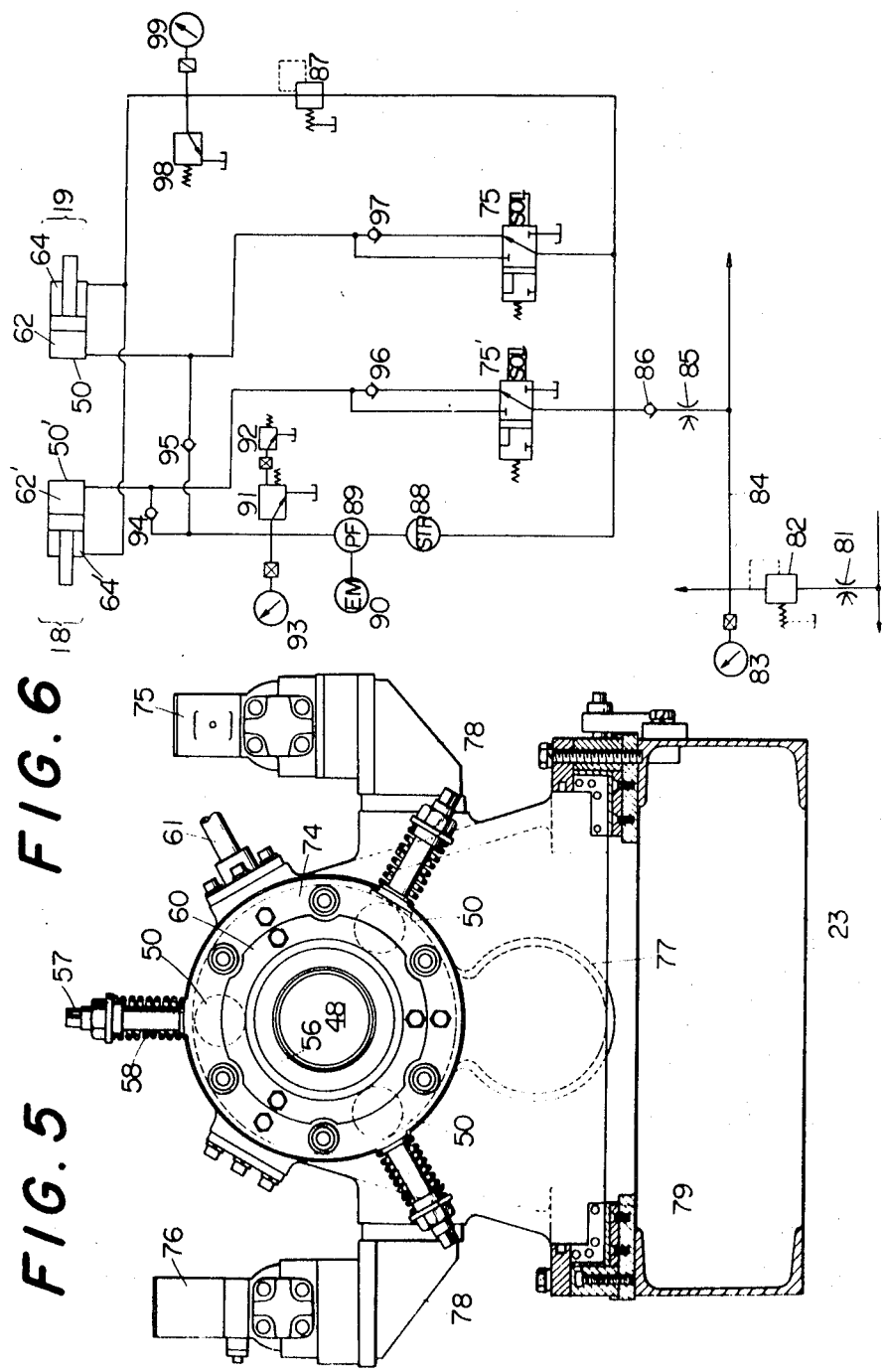

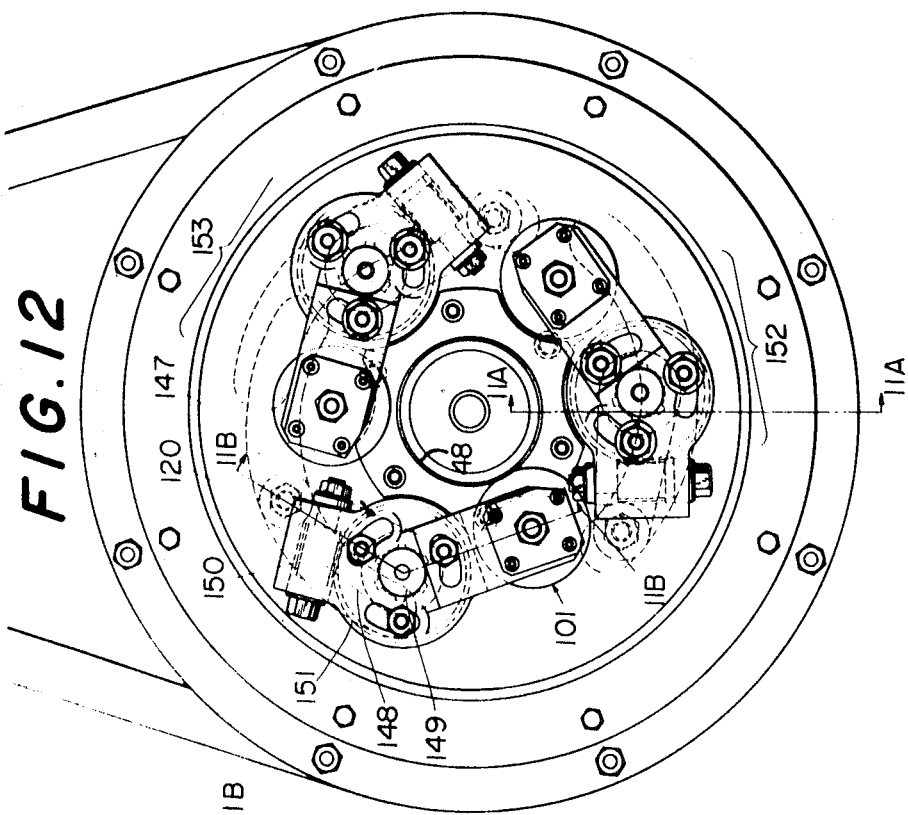
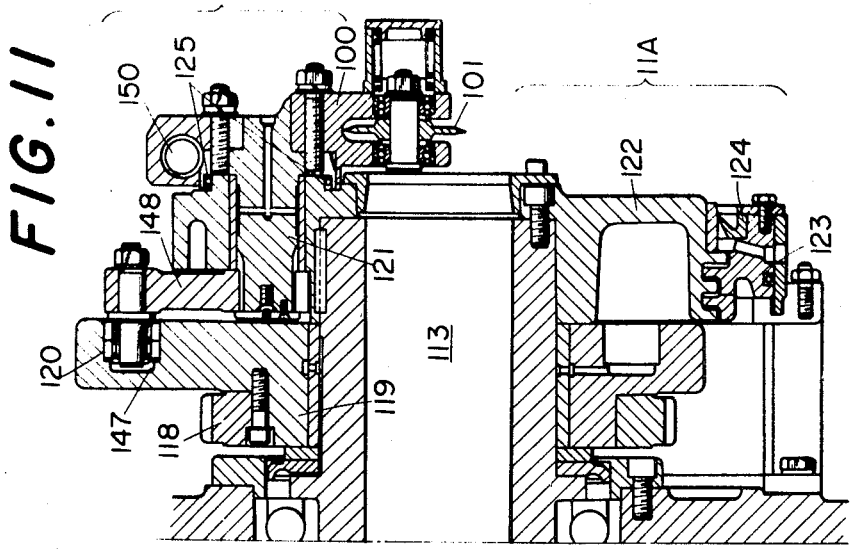

3,600,991

FLYING PIPE CUTTING APPARATUS

BACKGROUND OF THE INVENTION

This invention relates to a method and apparatus for cutting elongated metal bodies such as pipes moving at a constant speed into pieces of a predetermined length without stopping the movement of pipes, which are continuously manufactured by a metal pipe manufactured by a metal manufacturing line.

Various types of flying pipe cutting apparatus have used in the manufacture of metal pipes. For example, for a required length, the resulting errors usually range from 10 mm. to 35 mm. For this reason, as is well-known in the art, it has been required to again cut the pieces of the pipe to obtain finished products of the requisite length. Especially in apparatus utilizing disc cutters or cutting bites, scale accumulated on their driving mechanisms and on the sliding parts of their cutter feed mechanisms affect the operation of the cutting apparatus, thus resulting in malfunctioning of the apparatus. Continuous efforts have been made to improve the cutting accuracy, end finish of cut pieces and cutting efficiency. Research has also been made to provide a mechanism wherein the length of the cut pipe can readily be varied. While many types of pipe cutting apparatus are now available on the market there are many problems still unsolved.

OBJECTS OF THE INVENTION

It is an object of this invention to provide a new and improved flying pipe cutting apparatus which can cut continuously running metal pipes into pieces with high dimensional accuracy, thus eliminating the necessity of recutting cut pieces to the correct length.

Another object of this invention is to provide a high speed flying pipe cutting apparatus.

A further object of this invention is to provide a novel pipe clamping mechanism.

A still further object of this invention is to eliminate the deleterious effects of centrifugal force resulting from use of the cutter.

Briefly stated, according to this invention a carriage carrying a flying cutting machine is started and accelerated by means which detects the running speed of a metal pipe to be cut. When the flying cutting machine attains the same speed as the running pipe, clamping mechanisms are operated to clamp the cutter to the pipe. Thereafter, the cutting machine is moved by the running pipe and cutting is performed during this movement. A cutter is mounted on a spindle driven by an oil motor, and a differential gear mechanism is provided to urge the cutter toward the pipe at an incremented speed. Means is provided to cancel the centrifugal force created by the cutter. The cutter is resiliently supported by a spring means to provide an excellent cut finish.

BRIEF DESCRIPTION OF THE DRAWING

In the accompanying drawing:

FIG. 1 is a general plan view of a flying pipe cutter embodying this invention;

FIG. 2 is a side view of the pipe cutter shown in FIG. 1.

FIG. 3 shows an accelerating mechanism;

FIG. 4 shows a longitudinal section of the clamping mechanism;

FIG. 5 shows an end view of the mechanism shown in FIG. 4;

FIGS. 6 and 7 show diagrams of an oil pressure drive system in different operating conditions;

FIG. 11 is a longitudinal sectional view of a cutter head of the cutter feed mechanism shown in FIG. 8;

FIG. 12 shows an end elevation of the cutter head shown in FIG. 11;

and FIG. 13 is a sectional view of a cutter shift device utilized in this invention.

Before entering into detailed description of the flying pipe cutter embodying this invention, an outline thereof and some of the outstanding features thereof will be considered first. Referring now to FIGS. 1 and 2 of the accompanying drawing, an oil pressure mechanism is generally designated by a reference numeral 1, the main feature of this mechanism being a rotary coupling 4. As the carriage mechanism 14 moves, required oil pressure must be supplied constantly. The operating characteristics of the rotary coupler 4 determines the driving ability of the cutting apparatus as a whole and in some cases may result in interruption of the continuous operation of the production line. A first feature of this invention involved improvements in the rotary coupler, which relates to the elimination of thrust loads from various loads on a bearing, thus limiting the load only to the radial load. This greatly reduces the dimensions and weight of the bearing structure thus assuring stable operation over a long period of time.

Figures 7, 13:
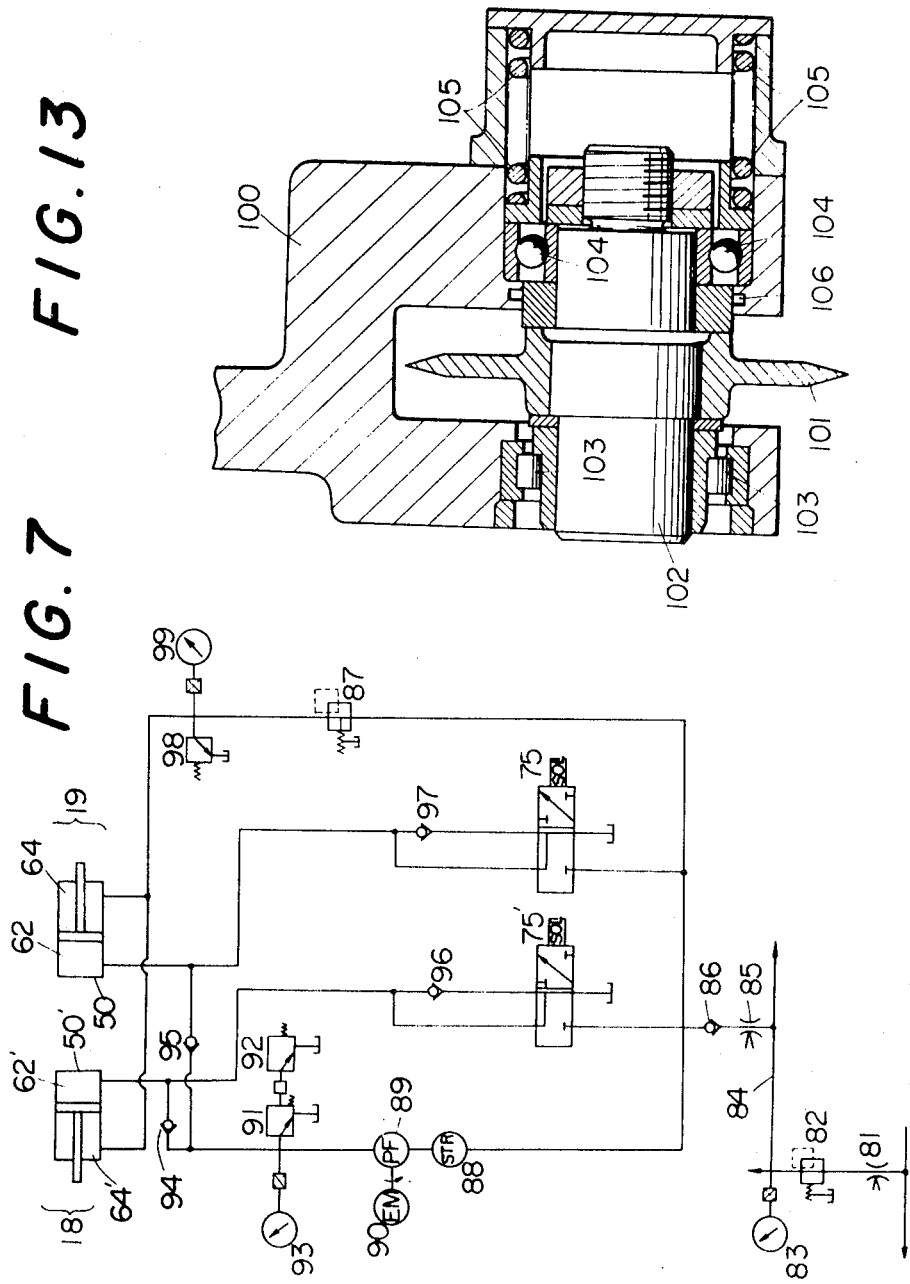

Reference numeral 5 generally designates a carriage driving mechanism to start and accelerate the carriage, thus advancing the carriage to a speed which is the same as the speed of the production line. When the carriage enters into the same speed region as the production line, the accelerating device automatically returns to the position indicated. This comprises a second feature of this invention. This feature is different from conventional mechanisms in that the accelerating device is not operated until the cutting operation has been completed. This not only provides stable operation of the clamping mechanism for metal pipes but also provides for easy cutting.

One of the features of this carriage mechanism 14 lies in the improved clamping mechanism for moving metal pipes which comprises mechanisms 18 and 19 located on the inlet side and outlet side, respectively. These mechanisms operate to positively clamp a pipe in response to a signal which is generated when the speed of advance of the carriage coincides with the line speed. To this end, chuck-type clamping blocks are operated by an oil pressure mechanism designed to be switched between high and low pressures, whereby high speed operation of the clamping blocks and stabilized clamping force can be assured. This constitutes a third feature of this invention.

The clamping mechanism includes a novel cutter shifting mechanism. It was found that where the cutter is fixed, burrs are formed on the cut ends of the pieces of cut metal pipes in the vertical direction at the inlet side. This greatly impairs the commercial value of the cut pipes. For this reason, in accordance with this invention, the cutter is urged by means of a spring on the outlet side, whereby the cutter is imparted with a certain degree or relief so that metal bodies maintained under tension applied by a clamping cylinder located on the outlet side can be readily cut, thus providing a sharp (or well-defined) cut, this being the fourth feature of this invention.

A fifth feature of this invention lies in the provision of a novel cutter feed mechanism. Heretofore it has been difficult to control the advance of cutting speed of the cutter. This greatly decreased the accuracy of cutting. According to this invention a phase difference between rotations of differential gears is detected to control the advance speed of the cutter. This greatly improves the stability and accuracy of the cutter feeding operation with the result that the dimensional accuracy of the cut pieces is greatly improved.

The carriage mechanism also includes a novel cutter head mechanism. The centrifugal force created by a cutter head which is ordinarily rotated at a speed above 1000 r.p.m. is considerably large and sufficient forces are generated to impair the cutting accuracy. In the carriage mechanism embodying this invention, means is provided to balance the centrifugal force created by the rotation of the cutter against the centrifugal force created by a worm gear mechanism used to adjust the position of the cutter blades, thus completely eliminating the deleterious effect of the centrifugal force.

The balancing of the main spindle for feeding the cutter is made on a plane perpendicular to the axis of the spindle. This greatly stabilizes the cutting operation and comprises a sixth feature of this invention.

The above described various improvements in the cutting apparatus of the present invention cooperate with each other in order to eliminate various difficulties encountered with conventional cutting devices.

Before describing the details of the construction of the novel cutting apparatus, the operation thereof will be briefly described.

AS a preliminary step, the rotational speed of a DC motor for driving a sizer is detected and the detected signal is applied to a detector 6, shown in FIG. 1 to drive an electric motor 7, thus causing a 1 revolution clutch 9 to rotate normally through a speed reduction mechanism 8. A metal body is fed into the cutting apparatus by said sizer and when the leading end of the metal body engages a flag switch 24 which has been set to the required cutting length a signal is generated by the switch to actuate an electromagnet 26 associated with one revolution clutch 9, thus causing it to engage to rotate a shaft 10. Rotation of the shaft 10 operates an accelerating cam 41 (see FIG. 3) to actuate a lever 11 to move forwardly a carriage stop whereby a carriage 14 is advanced. When the advancing carriage attains the same speed as the moving metal body a contactless switch (not shown) installed in a dial gauge 12 will provide a signal which is utilized to immediately operate clamping mechanisms 18 and 19 to clamp the moving metal body. Concurrently therewith, an independent timer, not shown, is set into operation. Thereafter, the carriage is continued to advance by the inertia alone of the moving metal body until the cutting operation is finished. Then, the signal from said timer causes a cutter 101 to begin to advance while at the same time a rack 135 (see FIG. 10) is operated to cause a deceleration valve 145 connected thereto to generate a signal for commencing the cutting operation. Upon completion of the cutting operation, a contactless switch (not shown) located close to the clamping mechanism 19 generates a signal to simultaneously retract the cutter 101 and rack 135. Thereafter the clamping mechanisms are opened to restore the carriage to its starting position.

It is to be noted that the carriage advancing lever 11 is to be restored to its original position by the action of a retracting cylinder 45 when the carriage attains the same speed as the moving metal body.

Turning now to the details of various mechanisms of the novel cutting apparatus, as shown in the FIG. 3, the starting device for the carriage 14 comprises a truck frame 23, a cam follower roller 39 cooperating with an accelerating cam 41, a pivot 40 for the advancing lever 11, a clutch 42 connected to shaft 10 shown in FIG. 1 a retracting cylinder 45 having a trunnion 43 and pivotally connected to the lever 11 at 44, a supporting pedestal 46 for the advancing mechanism and a bracket 47 for supporting the trunnion 43. As described hereinabove, when the flag switch 24 mounted on a rail 25 shown in FIG. 1 energizes the electromagnet 26 to engage the one revolution clutch 9 to rotate the shaft 10, the shaft 10 will rotate the accelerating cam 41 together with a block 155 secured to clutch 43. As the accelerating cam 41 is rotated, lever 11 is rotated in the counterclockwise direction as viewed in FIG. 3 to push forward the carriage 14 by a roller 38 carried on the free end of lever 11 through the carriage stop 13. The stroke of this forward movement of the carriage includes an acceleration region and an equal speed region. The time interval between these regions may be short, for example about 0.3 sec., which is sufficient to correspond to the change in the line speed. This time interval is present in the dial gauge 12 shown in FIG. 1, it being understood that a contactless switch is disposed at the set value. As the cam continues to rotate to cause the block 155 to operate the contactless switch, a clamping mechanism to be described later will be operated to rapidly restore lever 11 to the original position by the action of the retracting cylinder 45 whereby the lever becomes independent of the forward movement of the carriage. With the prior mechanism wherein the metal body is cut while it is clamped and advanced by a lever, it is very difficult to finish the cutting operation in a limited equal speed region. This impairs the dimensional accuracy of the resulting cut pipe. To obviate this difficulty, according to this invention, the carriage starting device is designed such that it is only effective to bring the carriage speed to a speed at which the carriage has the same speed as the line speed of the pipe.

The details of the clamping mechanism are shown in FIGS. 4 and 5, FIG. 4 being a sectional view taken in parallel with the axis of a metal pipe being cut whereas FIG. 5 is an end view. In these Figures, 48 designates a metal pipe, 49 a clamp body, 50 a cylinder contained in the clamp body, 51 a piston contained in cylinder 50, 52 a piston rod, 53 a guide ring adapted to support a clamp ring 54, 55 a clamp sleeve slidably contacting the clamp ring 54 and a clamp head 59, 56 a clamping block, 57 a rod for supporting the clamp sleeve and the clamp block, 58 designates a retracting spring for rod 57, 60 a guide ring for supporting the clamp head 59, 61 a conduit for supplying pressurized oil to the clamping mechanism, 62 a space in the cylinder, 63 a conduit for supplying pressurized oil to effect retraction, and 64 a space in the cylinder. 65 designates an O-ring for the piston, 66 a bracket for mounting a separator mechanism, 67 a pin of a piston rod, 69 a separator piston, 70 a piston ring therefor, 71 an opening for supplying pressurized oil for separation, 72 an oil seal for the piston 68, 73 a body of low pressure oil. 74 designates a retainer, 75 an electromagnetic valve for effecting a clamping operation, 76 an electromagnetic valve for effecting separation, 77 a separating cylinder, 78 brackets for supporting said electromagnetic valves and 79 slide plates for the clamping mechanism.

The mechanism shown in FIGS. 4 and 5 shows the mechanism 19 (see FIG. 1) on the outlet side of the metal pipe. It is preferable to fix the clamping mechanism on the inlet side as is the clamping mechanism 18 shown in FIG. 1 by eliminating slide plates 79.

As has been described hereinabove, as the cutting apparatus is constructed such that the accelerating cam 41 effects simultaneous operation of the clamp and timer to advance the cutter thus commencing the cutting operation after a predetermined time interval, where the clamping mechanism 18 on the inlet side is fixed as above described, the clamping mechanism 19 on the outlet side will be advanced slightly to apply tension to the metal tube by a cylinder (not shown) located close to the slide plates 79 for an interval as determined by timer. When a cutting operation is performed under these conditions, cutting can be made easily with excellent cut finishes. According to this invention, a contactless switch is disposed close to said cylinder (not shown). Upon completion of the cutting operation the cylinder immediately removes cut pieces of the pipe and the contactless switch operates to provide a signal that commands succeeding steps including retraction of the cutter.

FIGS. 6 and 7 illustrate an oil pressure system for operating said cylinder, clamping mechanisms and a cutter feed mechanism to be described later. This oil pressure system is connected to the oil pressure mechanism 1 shown in FIG. 1 to supply pressurized oil to various parts of the cutting apparatus from a pressurized oil unit 2 through an oil stand 4 and through rotary couplings 4.

FIG. 6 shows the condition wherein oil pressure driving cylinders are closed. Although FIGS. 6 and 7 illustrate two cylinders which are operated concurrently, it will be clear that only one cylinder may be used with the same result. In these Figures, reference numeral 81 designates a flow control valve, 82 a pressure reducing valve, 83 a pressure gauge thereof, 84 a piping, 85 a flow control valve, 86 a check valve, 87 a pressure reducing valve, 88 a straightener, 89 a pressurizing pump driven by an electric motor 90, 91 shows a relief valve respectively set to 70 to 175 kg./cm.$^3$ and backed up by a second relief valve 92 set to 5 to 70 kg./cm.$^3$, 93 a pressure gauge, 94 and 95 and 96 respectively check valves, 98 a low pressure relief valve, 99 a pressure gauge, 75 and 75' clamping electromagnetic valves, 50 and 50' clamping cylinders, 62 and 62' bodies of oil for closing the clamping mechanism, and 64 and 64' bodies of oil for opening the clamping mechanism.

The operation of the oil pressure system for the clamping mechanism shown in FIGS. 4 and 5 will now be considered by referring to FIGS. 6 and 7. While these clamping cylinders are depicted in FIG. 3 only one of them will be described in detail. The oil pressure system operates to supply low-pressure oil to respective cylinders and to cause the oil to circulate normally. When the cylinder is open the high-pressure oil is admitted into a tank, the reverse flow being prevented by check valves 94, 95, 96, and 97. Concurrently therewith, oil in cylinders 62 and 62' is also drained in the tank. At this time low-pressure oil is permitted to freely flow into cylinders 64 and 64' to maintain their pistons in the opened state. When electromagnetic valves 75 and 75' for clamping are switched (FIG. 7) oil will flow into cylinders 62 and 62' through electromagnetic valves 75 and 75' to push outwardly their pistons, reverse flow of the oil being prevented by check valves 96 and 97. Concurrently therewith high-pressure oil is supplied to cylinders 62 and 64' to strongly push outwardly their piston to complete a clamping operation. At this time reverse flow of the high-pressure oil is prevented by check valves 96 and 96' and this condition is maintained until a signal representing completion of the cutting operation is generated.

Under these conditions, for low-pressure operation, relief valve 98 is effective whereas for high-pressure operation relief valve 91 or 92 is effective.

Thus, the oil pressure system comprises three lines of low, intermediate and high pressures to increase the speed and accuracy of the operation of the pistons in the cylinders, whereby the accuracy and efficiency of the cutting operation are greatly improved.

The clamp operating mechanism shown in FIGS. 4 and 5 provided with above described pressure oil system operates as described below. In response to a signal representing the closure of the clamping mechanism effected by the accelerating cam 41, oil under medium pressure is admitted into the space 62 in cylinder 50 through electromagnetic valves 75 and 75' and check valves 97 and 96 shown in FIG. 7 to urge outwardly the piston 51 to advance clamp ring 54, whereby the clamp sleeve 55 is pushed down along rod 57 to quickly advance the clamping block 56. Subsequently, high-pressure oil is admitted to cause the clamping block 56 to firmly clamp the metal tube. As can be clearly noted from FIG. 5 the metal tube 48 is positively clamped by the illustrated clamping mechanism including three independent clamping blocks. Upon completion of the cutting operation of the metal tube 48, pistons are operated by the pressure oil system to release the clamping mechanism in response to a clamp opening signal in the same manner as above described.

Figure 8:
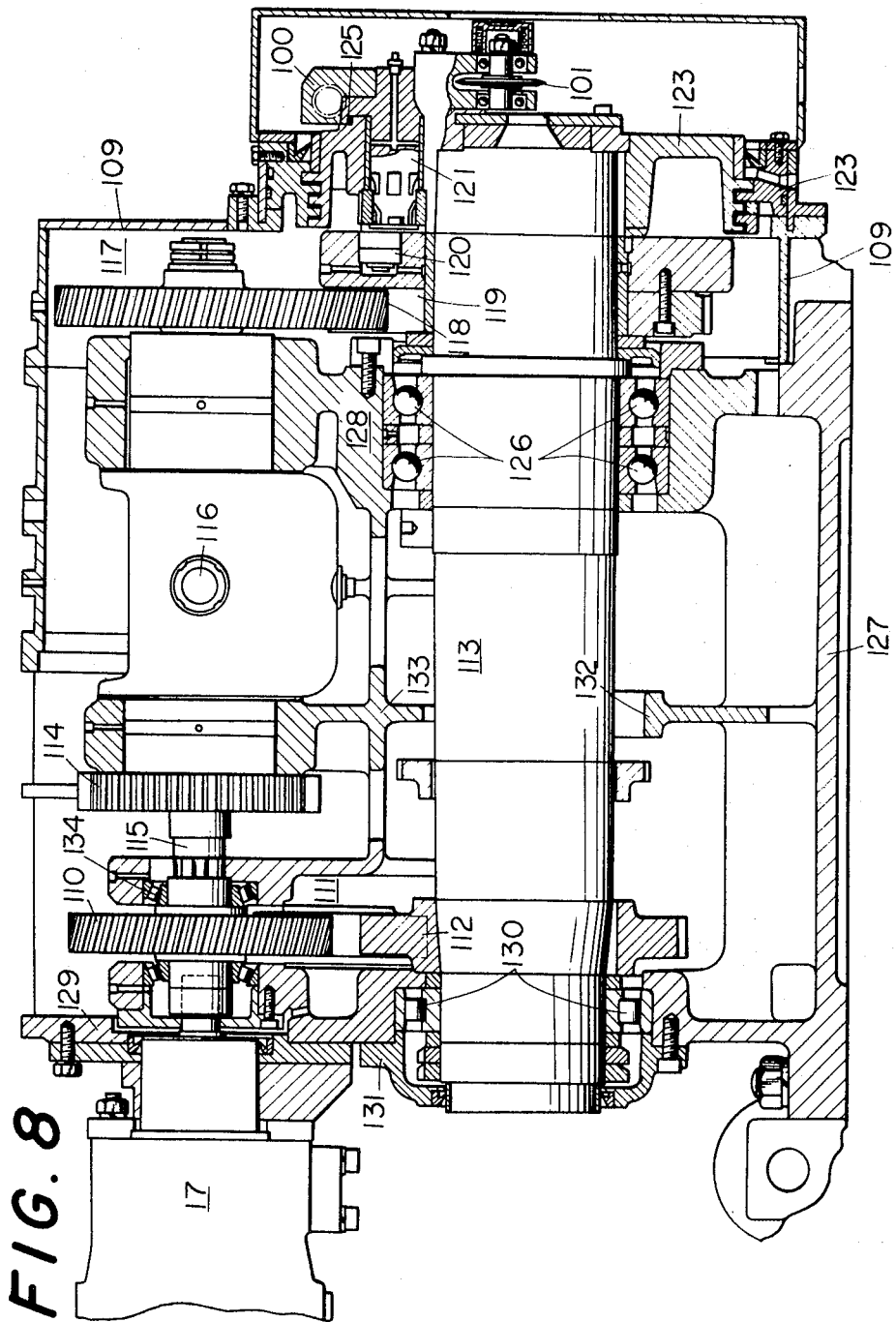
FIG. 8 shows a sectional view of a cutter feed mechanism utilized in this invention.
Figure 9:
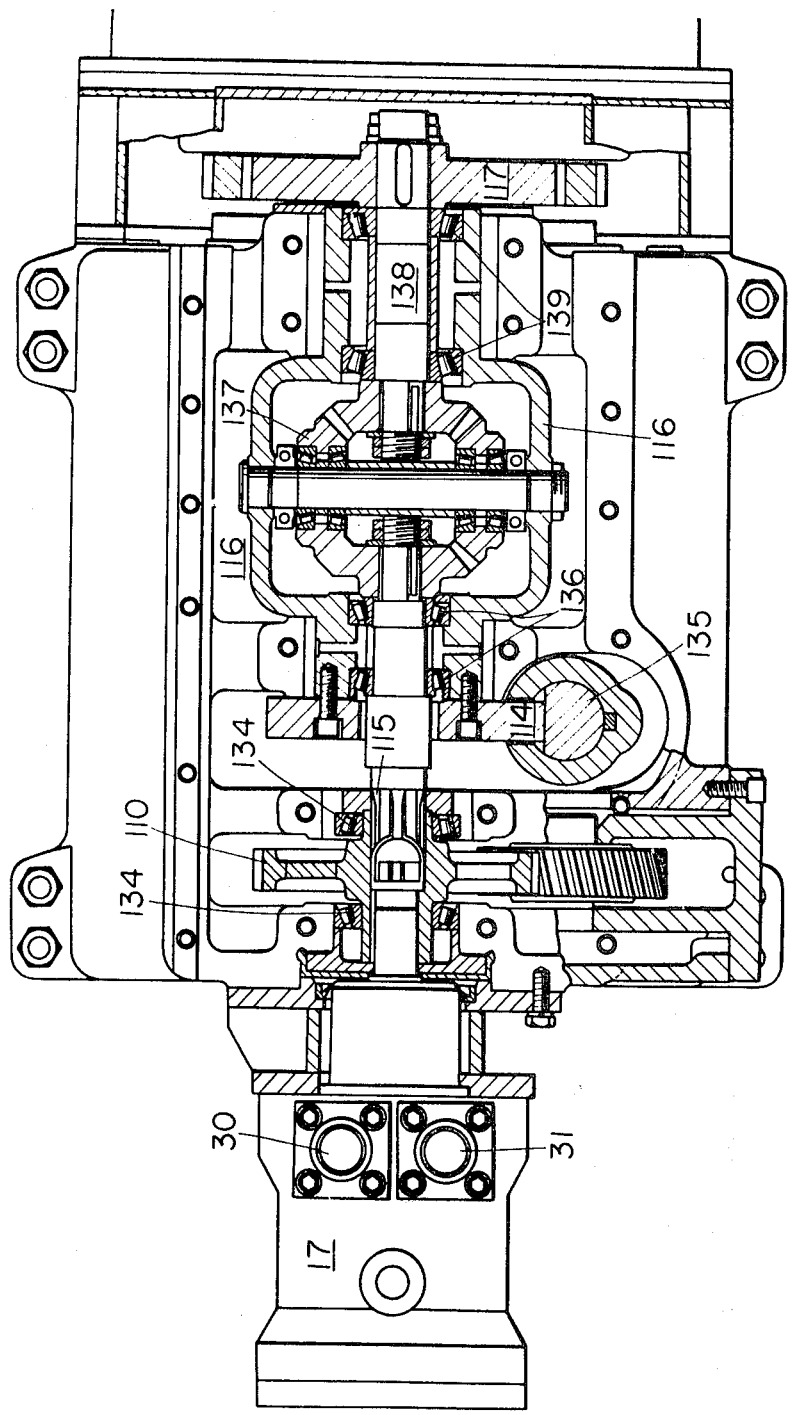
FIG. 9 shows a section of a differential gear mechanism utilized in the cutter feed mechanism shown in FIG. 8.
Figure 10:
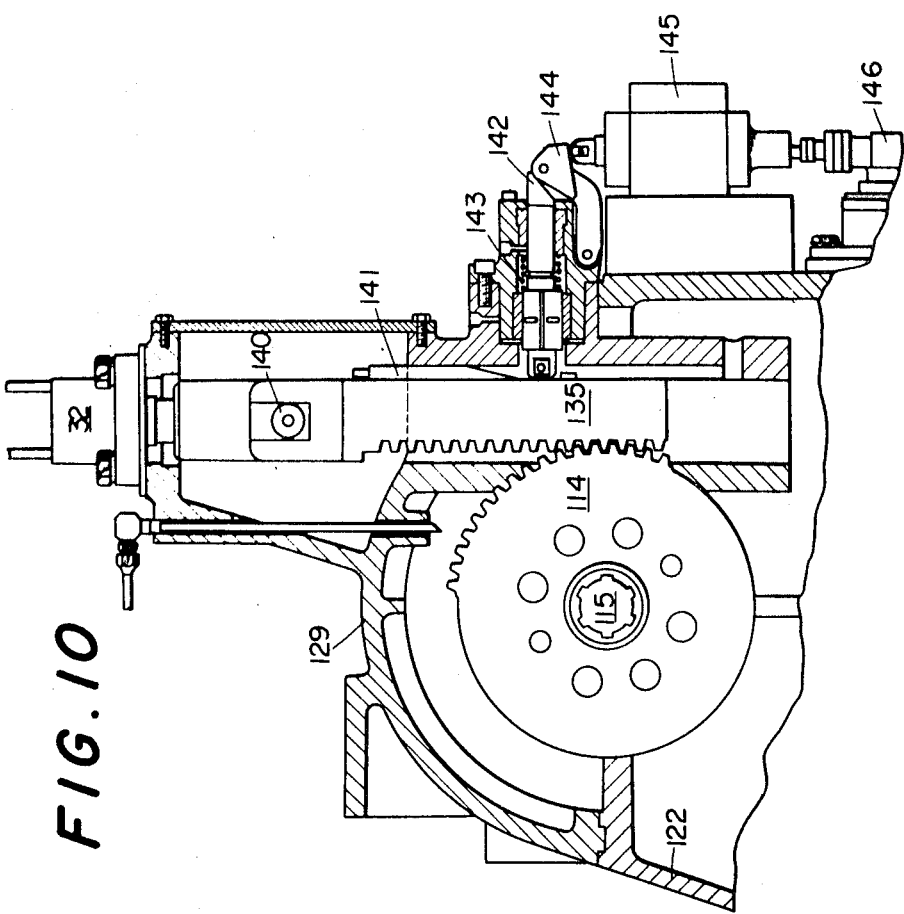
FIG. 10 is a partial enlarged view of a portion of the cutter feed mechanism.

FIGS. 8 through 13 illustrate a cutter feed mechanism which follows the clamping mechanism, in which FIG. 8 shows a longitudinal section of the cutting machine, FIG. 9 the details of the differential gears of the cutting machine shown in FIG. 8, FIG. 10 a cutter feed drive, FIGS. 11 and 12 details of the cutter head assembly and FIG. 12 the cutter head assembly. In FIGS. 8 and 9 reference numeral 17 designates an oil motor which drives a pinion 110, 111 shows an idle gear, 112 a gear supported by a spindle 113, 114 a clutch gear for rotating a differential gear box 116, 115 a spline shaft adapted to transmit the rotation of pinion 110 to pinion 117. 118 shows a gear adapted to rotate a cam plate 119, 120 a roller slidable along groove 147 machined in the cam plate 119. 121 shows a lever pin fixed to a cutter head 122 to support roller 120, 123 a labyrinth, 124 an oil seal, 125 an O-ring, 126 a bearing to support the main spindle, 127 a lower casing for the main body of the cutting mechanism, 128 an inner casing and 129 an upper casing. 126 designates bearings for supporting the main spindle and 131 a retainer. 132 and 133 show reinforcing ribs for said lower and inner casings, respectively. 134 shows a bearing for supporting bearing 110, 135 a driving clutch for gear 114, 136 a bearing for supporting a spline shaft for a bevel gear and 137 bevel gears journaled in a gear box. 139 designates a driving shaft for pinion 117 supported by bearings 139. 30 indicates an oil inlet port for the oil motor while 31 an outlet port. 100 shows a holder for a cutter 181 and 109 a cover plate for the main body of the cutting machine.

Turning now to FIG. 10, reference numeral 32 designates an operating cylinder for rack 135, 140 a pin and 141 an operating cam for a deceleration valve 145. 142 represents a push rod, 143 a restoring spring, 144 a push lever for said deceleration valve 145 and 146 a contactless switch for opening the clamping mechanism.

In FIGS. 11 and 12, numeral 147 designates a cam groove provided for a cutter plate, 120 a roller supported by a lever 148 to be slidable along cam groove 147 and 122 a cutter head to which lever 148 is secured by means of a pin 149. 150 shoes a worm gear for adjusting the position of the cutter, and 151 a worm wheel meshed with the worm gear. 152 designates the position of the cutter 101 occupying the most distant position away from pipe 48, whereas 153 designates the installation position of the cutter 101 in the case for cutting a pipe having a smaller diameter. For the sake of convenience the upper half of FIG. 11 shows a cross section taken along a line 11B—11B in FIG. 12 and the lower half that taken along a line 11A—11A in FIG. 12.

Finally, referring to FIG. 13 reference numeral 101 shows a cutter, supported by a shaft 102 journaled by bearings 103 and 104. 105 indicates a spring for the micro adjustment of the cutter, 106 an oil seal, and 100 a cutter holder connected to a lever 148 by means of a pin 121.

One of the characterizing features of the above described embodiment of the invention is the cutter feed mechanism employing differential gears. When the pinion 110 is driven by oil motor 17, where the differential gear box is not operated, the rotation of the motor is transmitted to pinion 117 to rotate it in the opposite direction. The main spindle 113 is rotated in the opposite direction by oil motor 17 through pinion 110 and gear 112. Thus, pinion 117 and main spindle 113 are rotated in the same direction. As described above, gear 114 connected to the differential gear box is slidably mounted on spline shaft 115. When rack 135 meshing with gear 114 is operated differentially in response to the clamp termination signal, inward movement of the piston (not shown) contained in the cylinder 32 caused thereby will rotate the gear 114 whereby to rotate the differential gearbox 116 by an amount corresponding to the movement of rack 135.

As a result the number of revolutions of the pinion 117 will be increased by the amount of rotation of the gear box. This can be expressed by:

$$N = \frac{n_1 + n_2}{2}$$

$$n_2 = 2N - n$$

where $N$ represents the number of revolutions of the differential gear box, $n_1$ that of the pinion 110 and $n_2$ that of pinion 117.

The rotation of the pinion 117 is transmitted to cam plate 119 via gear 118 and the number of revolutions of the cutter head 122 fixed to the main spindle 113 is increased by the increment produced by the differential gears. As the lever 148 with roller 120 secured to its outer end is connected to the cutter head 122 and the cam plate 119 is formed with a groove which is inclined in the direction of rotation to receive roller 120, the roller slides along cam groove 147 at a speed corresponding to the incremented speed of the pinion 117. As a result, cutter 121 will be forced toward the axis by the inclined surface of the cam slot 147. If the pipe to be cut is held at this center, the pipe could be cut at the same speed as that of the main spindle 113 and with a fixed speed of the pinion 117. The length and inclination of the cam groove 147 are determined dependent upon the diameter and wall thickness of the metal tube. Likewise the number of teeth of rack 135 and gear 114 may be determined in accordance with the length of the cam groove 147.

One of the features of the cutter head shown in FIGS. 11 and 12 is that the effect of the centrifugal force created by high speed rotation is cancelled by the cutter and worm gear secured to the cutter head. The cutter has a tendency to depart from the center due to the centrifugal force, thus reducing the cutting effect. However, with the mechanism embodying this invention this tendency can be precluded and the cutter can be positively fed into the pipe. This is because the cutter head forces are canceled in a plane perpendicular to the direction of movement.

As already has been pointed out hereinabove, in the novel cutting mechanism, the clamping mechanism on the input side is fixed whereas that on the outlet side is arranged to be operated by cylinders so as to apply tension to the metal pipe. When the clamping mechanism performs a cutting operation on the metal pipe maintained in this manner, excellent cut finishes can be realized at a high efficiency. Furthermore, in accordance with this invention the cutter mounting mechanism has been improved to further improve the cut finish. As is well recognized by those skilled in the art, when pipes are cut by a fixed cutter burrs are formed on the cut ends of the cut pieces. To avoid this difficulty, according to this invention, the cutter is yieldingly held by compression spring 105 as shown in FIG. 13. It was found that this construction has resulted in excellent cut ends without any burrs. It is believed that this result is caused by the fact that the stress created by the cutting action of the cutter is absorbed by spring 105.

Thus, the novel pipe cutting apparatus can cut metal pipes with high dimensional accuracy and cutting efficiency. The apparatus can make 10 cuts per minute. After the cutting operation has been completed, the contactless switch located close to the operating cylinder of the clamping mechanism on the outlet side emits a signal that actuates cylinder 32 (FIG. 10) to retract rack 135. As the rack 135 moves downwardly, cam 141 formed thereon operates to disengage the deceleration valve 145 whereby the contactless switch 146 operates to provide a signal. In response to this signal the clamping mechanisms are released to restore the various mechanisms to their original positions.

As shown in FIG. 8, since the cutting apparatus is completely sealed by means of labyrinth 123, oil seal 124, O-ring 125 and cover 109, invasion of mill scales into the interior of the cutting mechanism can be perfectly precluded so that the mechanism can operate stably.

With prior cutting apparatus utilizing a synchronizing device such as trigger system or a measuring wheel, the cutting accuracies were at most +10 and −0 mm. In contrast, the present novel cutting apparatus can improve the cutting accuracies to +5 mm. and −0 mm. with an excellent cut finish. Moreover, the cutting efficiency was increased by 100 percent. The present novel cutting apparatus is especially useful to cut electrically welded pipes and the like.

While the invention has been shown and described in terms of a preferred embodiment thereof, it will be obvious to those skilled in the art that many changes and modifications may be made within the true spirit of the invention as defined in the appended claims.

We claim:

1. A flying pipe cutting apparatus for cutting a running pipe which is moving at a predetermined speed, comprising:
   a flying cutter including a cutting member, and having counterbalancing means which includes a worm and worm wheel coupled to said flying cutter for balancing out the centrifugal forces created by said flying cutter and said counterbalance means;
   means including a lever and cam to start and accelerate with a substantially constant acceleration said flying cutter;
   a plurality of pipe clamping mechanisms axially spaced along the length of the pipe, each including a plurality of clamp members spaced around the periphery of the pipe, said flying cutter being located between a pair of said pipe clamping mechanisms;
   means for actuating said clamping mechanisms when said flying cutter attains the same speed as said running pipe to clamp said flying cutter to said running pipe;
   tensioning means for displacing one clamping mechanism relative to another clamping mechanism to tension said pipe;
   means to operate the cutter member of said flying cutter at a predetermined speed; and
   a differential gear mechanism coupled to said flying cutter for feeding said flying cutter towards said pipe at an incremented speed.

2. The flying pipe cutting apparatus according to claim 1 wherein said clamping mechanisms comprise:
   a fixed clamping mechanism on the inlet side of said cutting machine; and
   a cylinder actuated clamping mechanism on the outlet side, said cylinder actuated mechanism including:
      a plurality of equally spaced clamping blocks positioned around the periphery of said pipe; and
      means for feeding oil under pressure into said cylinder when said cutting machine attains the same speed as said running pipe, to clamp said pipe with said clamping blocks.

3. The flying pipe cutting apparatus according to claim 1 wherein the flying cutter which is mounted between clamping mechanisms comprises:
   an input pinion driven by an oil pressure motor;
   a spindle driven by said input pinion;
   an output pinion;
   a differential gear mechanism located between said input pinion and output pinion;
   a center bevel gear;
   a pinion and a rack connected to said center bevel gear whereby said output pinion is driven at a speed higher than that of said input pinion by a speed increment provided by said differential gear mechanism,
   a cam plate coupled to said output pinion, said cam plate being provided with a groove having a length corresponding to the stroke of said rack;
   a cutter head secured to said spindle;
   a lever secured to said cutter head; and
   a roller secured to said lever and being received in said groove on said cam plate;
   said cutter being fed toward the pipe by the sliding movement of said roller along said cam groove.

4. The flying pipe cutting pipe apparatus according to claim 1 wherein said flying cutter comprises a cutter head carrying a cutter mounted on the end of a spindle rotated by an oil pressure motor.

5. The flying pipe cutting apparatus as claimed in claim 1 wherein said flying cutter comprises:
   a cutter head mounted on one end of a spindle which is rotated at a high speed by an oil motor, said cutter head being perpendicular to the axis of rotation of said spindle;
   a cutter holder and a cutter secured to said cutter head in a direction perpendicular to the axis of rotation of said spindle; and
   a spring mounting said cutter on the outlet side of said cutter holder for urging said cutter against said pipe during operation of the apparatus.

6. The flying pipe cutting apparatus according to claim 1, wherein said cam is an eccentric cam having a predetermined curvature and wherein said lever is operatively coupled to said cam to advance said flying cutter, said starting and accelerating means further including a contactless relay coupled to said cam for providing a signal for actuating said plurality of pipe clamping mechanisms to clamp said running pipe and to cause said flying cutter to move together with said running pipe.

7. The flying pipe cutting apparatus according to claim 2 wherein said cylinder actuated clamping mechanism includes a plurality of cylinders coupled to respective clamping blocks.